(12) United States Patent
Koerner et al.

(10) Patent No.: US 9,222,741 B2
(45) Date of Patent: Dec. 29, 2015

(54) SAFETY SYSTEM FOR A HAND GUN TO PREVENT UNAUTHORIZED USE

(71) Applicants: Siegbert Sauer, Dresden (DE); Klaus Gersten, Dresden (DE); Juergen Koerner, Pirna (DE); Uwe-Thomas Schade, Coswig-Soernewitz (DE)

(72) Inventors: Juergen Koerner, Pirna (DE); Uwe-Thomas Schade, Coswig-Soernewitz (DE)

(73) Assignees: Siegbert Saur, Resden (DE); Klaus Gersten, Dresden (DE); Juergen Koener, Pirna (DE); Uwe-Thomas Schade, Coswig-Soernewitz (DE)

( * ) Notice: Subject to any disclaimer, the term of this patent is extended or adjusted under 35 U.S.C. 154(b) by 0 days.

(21) Appl. No.: 14/415,169

(22) PCT Filed: Jul. 8, 2013

(86) PCT No.: PCT/DE2013/000379
§ 371 (c)(1),
(2) Date: Jan. 16, 2015

(87) PCT Pub. No.: WO2014/012529
PCT Pub. Date: Jan. 23, 2014

(65) Prior Publication Data
US 2015/0233661 A1    Aug. 20, 2015

(30) Foreign Application Priority Data
Jul. 16, 2012   (DE) .......................... 10 2012 014 400

(51) Int. Cl.
*F41A 17/44*   (2006.01)
*F41A 17/42*   (2006.01)

(52) U.S. Cl.
CPC ................. *F41A 17/42* (2013.01); *F41A 17/44* (2013.01)

(58) Field of Classification Search
CPC ......... F41A 17/04; F41A 17/44; F41A 17/64; F41A 17/42; F42B 8/08; F41C 27/00
USPC ............................................... 42/70.01, 70.11
See application file for complete search history.

(56) References Cited

U.S. PATENT DOCUMENTS 3,595,439 A * 7/1971 Newby .................. A61C 5/064
                                                                            206/219
3,768,189 A * 10/1973 Goodrich ............... B65D 55/14
                                                                            215/207

(Continued)

FOREIGN PATENT DOCUMENTS

DE       29920895       9/2000
DE       19957160       2/2001

(Continued)

OTHER PUBLICATIONS

International Search Report for PCT/DE2013/000379, English translation attached to original, Both completed by the European Patent Office on Nov. 26, 2013, All together 6 Pages.

*Primary Examiner* — Bret Hayes
*Assistant Examiner* — Derrick Morgan
(74) *Attorney, Agent, or Firm* — Brooks Kushman P.C.

(57) ABSTRACT

Safety system for a hand gun to prevent unauthorized use, with a blocking cartridge inserted and locked in the chamber of a hand gun, wherein upon manipulating said blocking cartridge in an internally located reaction chamber the individual components of an adhesive system are brought together, whereupon following the reaction of the components, the still-pasty adhesive system spreads and escapes through openings in the wall of the blocking cartridge and, after hardening, firmly adheres the blocking cartridge to the chamber. The blocking cartridge can be released only by an authorized institution or person equipped with a connection-releasing technology that is matched by the manufacturer to the composition of the adhesive system.

11 Claims, 6 Drawing Sheets

(56) References Cited

U.S. PATENT DOCUMENTS

| | | | |
|---|---|---|---|
| 4,224,753 A | 9/1980 | Bielman | |
| 4,398,366 A * | 8/1983 | Wernicki | F41A 17/44 42/70.11 |
| 4,512,099 A * | 4/1985 | Mathew | F41A 17/44 42/70.11 |
| 4,676,406 A * | 6/1987 | Frischmann | B01F 11/0082 16/225 |
| 5,054,223 A * | 10/1991 | Lee | F41A 17/44 42/70.11 |
| 5,239,767 A * | 8/1993 | Briley, Jr. | F41A 17/44 42/70.11 |
| 5,273,190 A * | 12/1993 | Lund | B05C 17/00553 222/105 |
| 5,361,526 A | 11/1994 | Campbell | |
| 5,664,358 A * | 9/1997 | Haber | F41A 17/44 42/44 |
| 6,502,344 B1 | 1/2003 | Zeh et al. | |
| 7,121,033 B1 * | 10/2006 | Waller | F41A 17/04 42/70.11 |
| 7,832,136 B2 | 11/2010 | Rush | |
| 8,087,551 B2 * | 1/2012 | Henley, II | F41A 13/04 206/219 |
| 8,677,668 B1 * | 3/2014 | Caldwell | F41A 17/44 42/66 |
| 2002/0189148 A1 * | 12/2002 | Hanson | F41A 17/44 42/70.11 |
| 2007/0137085 A1 * | 6/2007 | Aske | F41A 17/44 42/70.11 |
| 2011/0173860 A1 * | 7/2011 | Arendt | F41A 17/44 42/70.11 |

FOREIGN PATENT DOCUMENTS

| | | |
|---|---|---|
| DE | 29920918 | 4/2001 |
| DE | 10200601266 | 6/2009 |
| WO | 2011070064 | 6/2001 |

\* cited by examiner

DETAIL A
SCALE 2:1

SECTION A-A
SCALE 1:1

Fig. 10

DETAIL B
SCALE 2:1

SAFETY SYSTEM FOR A HAND GUN TO PREVENT UNAUTHORIZED USE

CROSS-REFERENCE TO RELATED APPLICATION

This application is the U.S. national phase of PCT Application No. PCT/DE2013/000379 filed on Jul. 8, 2013, which claims priority to German Patent Application No. 10 2012 014 400.8 filed on Jul. 16, 2012, the disclosures of which are incorporated in their entirety by reference herein.

The invention relates to a weapon safety system with a design that is favorable from the manufacturing technology viewpoint and has improved practical value for the operation and protection of the barrel of a hand gun with a generically blocked cartridge chamber before removing the breech of the cartridge chamber, with the objective of preventing the unauthorized commissioning of the weapon.

Arrangements of the generic type known as a safety plug, for example locking the cartridge chamber (IPK F41A 17/44), have become known with DE19957160C1, DE29920895U1 or even DE29920918U1. They enable a blocking arrangement for insertion into the cartridge chamber or the barrel of a hand gun to protect against unauthorized removal such that said removal can only be achieved without complex special tools with the outcome of destroying the cartridge chamber and barrel.

It was thus proposed in DE19957160C1 to use an insert formed on both sides as an expansion sleeve in the cartridge chamber of the barrel of a hand gun. Pretensioned expanding mandrels are inserted in both ends of the expansion sleeve so that when axial pressure is exerted on the expanding mandrels the mandrels hook into the inner wall of the barrel and of the cartridge chamber and thus ultimately destroy the weapon. The authorized release of said safety arrangement should only be possible by a person skilled in the art with access to special tools, such as an electrical erosion device, by the same removing safety plates disposed on the expanding mandrels only with such a tool so that access is obtained for releasing the pretension on the expanding mandrels and then the relaxed safety arrangement can be pulled out of the cartridge chamber without damage.

The disadvantage of such a solution for protecting a hand gun against unauthorized commissioning is that said person skilled in the art for removing the safety arrangement cannot be specifically defined as such by the manufacturer of the safety arrangement as the authorized person with regard to the means to be used for the release of the safety arrangement. Unauthorized attacks on the safety arrangement in ignorance of the function of the safety arrangement indeed meet the interests of safety by preventing the commissioning of the weapon, but on the other hand they result in permanent degradation of the weapon.

With U.S. Pat. No. 7,832,136 B2 a safety system was proposed that causes blocking of the weapon in the event of unauthorized use by expanding a hollow body in the cartridge chamber. Said safety system, which is only for use for weapons with a mass-inertia lock, can even be removed by an unauthorized person relatively easily without the use of a special tool and without damage to the weapon in view of the taper of the cartridge chamber.

U.S. Pat. No. 4,398,366 A reveals a purely mechanically constructed barrel safety system with a numerical lock combination. The locking cartridge used in this case is, however, only suitable for such weapons that fire cartridges with rims. The use is thus limited only to revolvers. The disadvantage of said barrel safety system is the possibility of removal without special tools without associated damage to the weapon. When utilizing the safety system, moreover, the rounds locked in the cartridge can expand the cartridge such that the weapon can be completely destroyed.

The safety system proposed with U.S. Pat. No. 4,224,753 A consists of a plurality of individual parts, whose operation is inconvenient as a result of the requirement for the partial dismantling of the weapon before using the same. A further disadvantage of said safety system is that the breech can no longer be released after use without destroying the cartridge extractor or stripping off the rim of the cartridge. A further safety deficiency is the locking or unlocking of the weapon only by means of a simple key.

As a safety system U.S. Pat. No. 5,664,358 A comprises an expansion system for the cartridge chamber of the weapon in combination with a numerical lock combination disposed on the muzzle of the barrel for unlocking and locking the weapon. The proposed expansion system can easily lead to damage to the cartridge chamber wall, to the transition cone and to the inner wall of the barrel, especially in the event of forcible handling.

An electronically protected blocking system is proposed by DE 10 2006 011 266 B4, whose locking system in the cartridge chamber leaves strong signs of wear on the inner walls of the barrel up to plastic deformations during each use, especially in older weapons with soft barrel steels. Overall, electronically controlled locks have the disadvantage that they can be destroyed by the influence of the magnetic field alone when arc welding is used.

The object of the invention is to design a weapon safety system such that it can be used for most types of weapons and calibers on the one hand in the everyday armed services, but on the other hand also by hunters, marksmen, weapon collectors, weapons inheritors and similar authorized persons, through safety in use and inexpensive manufacture. The removal of a triggered safety system should usually only be reserved for such an authorized person having a means for its release matched to the respective safety system by the manufacturer.

The object is achieved with the features of claim 1. Advantageous embodiments are explained in the dependent claims.

Essentially, in the case of a blocking cartridge inserted and locked in the cartridge chamber of a hand gun, in the event of its manipulation the individual components of an adhesive system are brought together in an inner reaction chamber, whereupon following the reaction of said components the still pasty adhesive system escapes by expansion through openings in the wall of the blocking cartridge and adheres the same fixedly to the cartridge chamber after hardening. The release of the blocking cartridge should only be possible by the use of a joint-dissolving technology matched to the composition of the adhesive system by the manufacturer and used by an authorized institution or person equipped with said technology.

In another embodiment of the invention, the blocking cartridge contains a reaction chamber in the interior for receiving the individual components of the adhesive system, which are initially separated from each other, in the manner of a ready position and for melting said components during release of the safety system. Outlet openings in the wall of the blocking cartridge enable the adhesive system, which expands during the reaction, to pass from the reaction chamber to the cartridge chamber and to adhere fixedly to the same.

The locking of the blocking cartridge in the cartridge chamber and the triggering of the safety system in the event of manipulation take place in the simplest case with a mechanical system consisting of a locking system disposed on the blocking cartridge with a keyhole, a connecting rod that engages therein and that can be axially twisted within the barrel of the weapon with a key bit fitting to the locking system of the blocking cartridge and a closure cone that closes the barrel muzzle of the weapon and that receives the connecting rod, the same advantageously forming a conical frustum shaped numerical code lock with a plurality of setting rings.

The safety system is narrowly defined in that the blocking cartridge is mounted in the cartridge chamber of the hand gun and the breech of the weapon is closed. The connecting rod is inserted into the barrel from the muzzle of the barrel until its key bit engages in the locking system of the blocking cartridge. Following the correct setting of the encoding of the closure cone with integrated lock covering the muzzle of the barrel, the same is locked to the connecting rod. The key bit of the connecting rod is locked in the locking device of the blocking cartridge by turning the lock. The safety system can now only be removed in the reverse sequence by an authorized person with knowledge of the correct encoding of the lock in the closure cone in front of the muzzle.

If the safety system is manipulated, generally by forcibly tilting the closure cone or axially pulling on the lock towards the muzzle of the barrel or after opening the breech of the weapon by attempting to forcibly eject the blocking cartridge with the cartridge extractor of the weapon, the storage containers of the individual components of the adhesive system disposed in the reaction chamber of the blocking cartridge are mechanically damaged in the simplest case, whereby following mixing of said components and the reaction thereof with each other the still pasty and expanding adhesive system is forced through the outlet openings in the wall of the blocking cartridge into the cartridge chamber and hardens there. The blocking cartridge is thus fixedly adhered to the cartridge chamber. The hand gun to be protected is thereby initially rendered unusable.

Dissolving the adhesive takes place by the activation of a joint-dissolving technology, such as dissolving the adhesive system by the action of a solvent. Said solvent can advantageously already be matched to its composition by the manufacturer of the adhesive system and only be available to the institution or person that is authorized to release the safety system. The variable setting of the composition of the adhesive system, combined with the composition of the solvent matched thereto, significantly increases the security preventing release of the safety system by unauthorized persons.

The invention is described in more detail below using the exemplary embodiment illustrated in the figure as extracts and partially schematically. In the figures FIG. 1 shows the proposed safety system according to the invention schematically using the example of a pistol 1 protected against unauthorized commissioning. It essentially consists of a blocking cartridge 4 inserted into the cartridge chamber 2 of the barrel 3 with a locking system 5 connected thereto, a closure cone 6 with lock 7 covering the muzzle of the barrel 3 and, as FIG. 4 also shows, a connecting rod 8 with a key bit 9 inserted into the barrel 3 between the locking system 5 of the blocking cartridge 4 and the closure cone 6.

Figure 2:
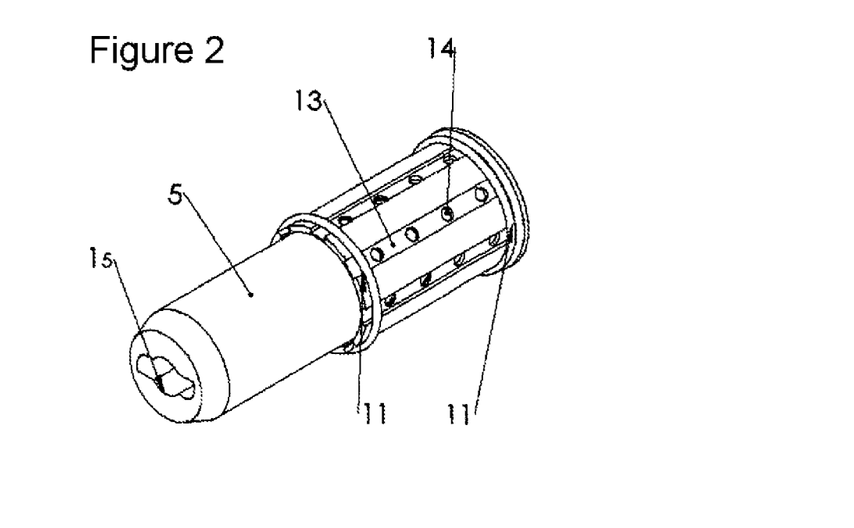
FIG. 2 shows the perspective view of the blocking cartridge with key hole

As illustrated in a perspective view by FIG. 2, the blocking cartridge 4, which is of the same caliber as regular cartridges 10 of the pistol 1, has a reaction chamber 12 in its interior and is rigidly joined to the attached locking system 5 oriented towards the muzzle of the barrel 3. The reaction chamber 12 is disposed within the blocking cartridge 4, wherein its walls, as FIG. 2 shows, are externally provided with longitudinal grooves 13 and within said longitudinal grooves 13 with outlet openings 14 passing through the wall.

Figure 4:
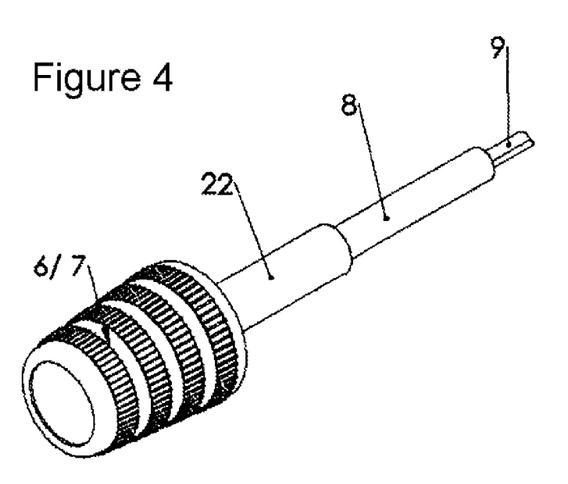
FIG. 4 shows the connecting rod with key bit and lock

The locking system 5 disposed on the blocking cartridge 4 is, as FIG. 4 shows, provided in the exemplary embodiment with a key hole 15, which is formed to correspond to the key bit 9 of the connecting rod 8. At the muzzle end of the barrel 3 the connecting rod 8 engages in the closure cone 6 and can be locked to the same there by means of the lock 7.

The reaction chamber 12 disposed within the blocking cartridge 4 contains, in the simple case, individual components 17 of an adhesive system 18 filled in containers 16 that can be easily torn open.

Figure 5:
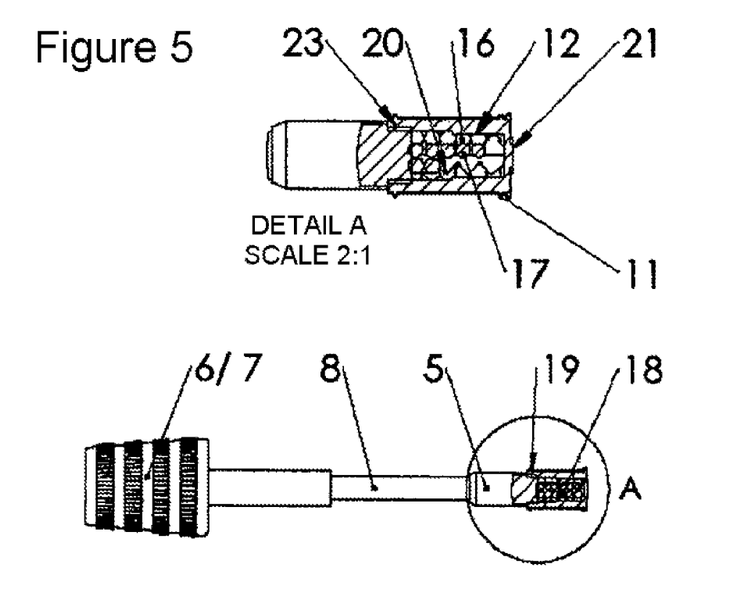
FIG. 5 shows the activation arrangement with tearable thread with a detailed illustration
Figure 6:
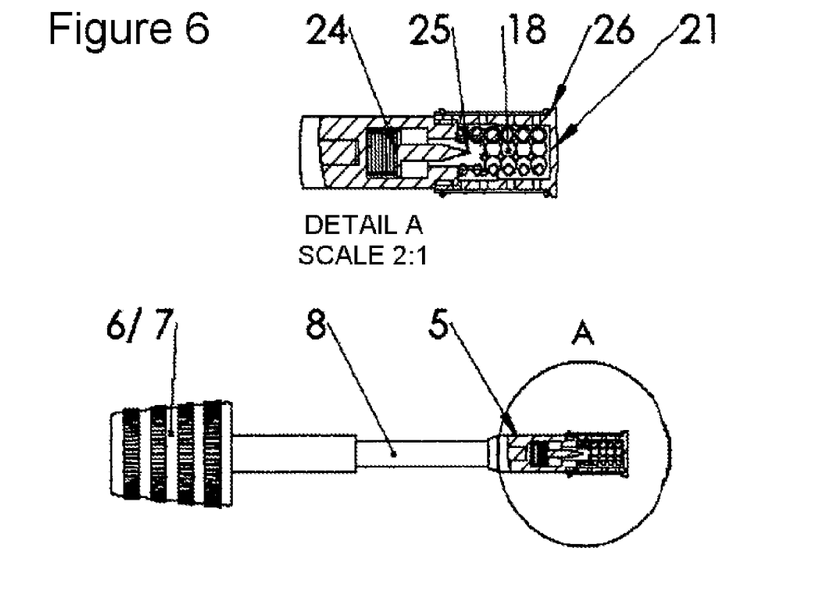
FIG. 6 shows the activation arrangement with impact tip with a detailed illustration

Moreover, an activation arrangement 19 engages in the reaction chamber 12 of the blocking cartridge 4 to tear open the container 16 containing the components 17 of the adhesive system 18, in the exemplary embodiment essentially consisting of a drawknife arrangement 20 or even an impact tip 25.

Figure 1:
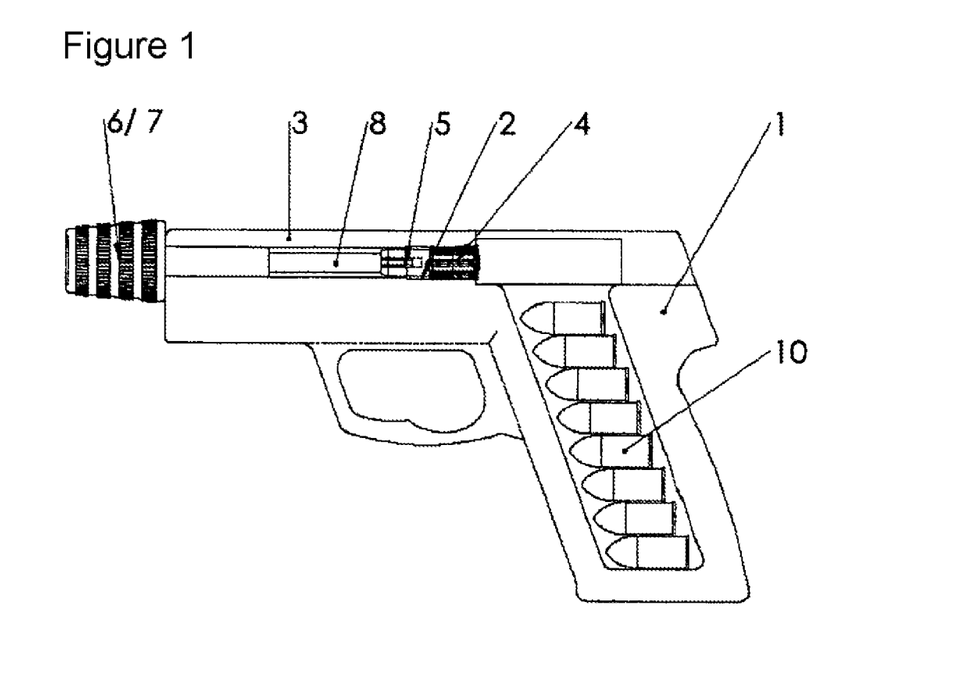
FIG. 1 shows a hand gun provided with the safety system

The closure cone 6 covering the muzzle of the barrel 3 is of a conical frustum shape in front of the muzzle of the barrel in the exemplary embodiment in order to impede an unauthorized tool attack and is provided with a lock 7 that is advantageously in the form of a numerical code lock.

Figure 3:
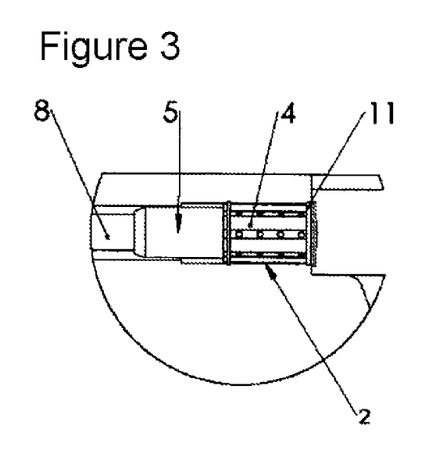
FIG. 3 shows the blocking cartridge, locked by the key, disposed in the cartridge chamber of the hand gun

The safety system is mounted on the pistol 1 selected for the exemplary embodiment such that following opening of the breech of the pistol 1 the blocking cartridge 4 is first inserted into the cartridge chamber 2 of the barrel 3. Following closure of the breech of the pistol 1, the connecting rod 8 provided with the closure cone 6 is inserted into the barrel 3 of the pistol 1 until its key bit 9 engages in the key hole 15 of the locking system 5 disposed on the blocking cartridge 4.

Whereas the closure cone 6 can be freely rotated on the connecting rod 8 in the case of incorrect setting of the programmed lock 7, the same is locked to the closure cone 6 in the case of correct setting of the lock 7. As a result of rotating the closure cone 6, the key bit 9 of the connecting rod 8 can also be rotated in the locking system 5 of the blocking cartridge 4 by means of the locking system 5 disposed on the blocking cartridge 4. The blocking cartridge 4 is thus locked in the cartridge chamber 2 of the pistol 1 and can only be removed again in the reverse order on entry of the correct encoding of the lock 7.

The blocking cartridge 4 can be provided with one or a plurality of O-rings 11, thus improving the adhesion relative to the cartridge chamber 2 and preventing the excessive penetration of the adhesive system 18 into the barrel 3 or the breech of the weapon.

Not the subject matter of the invention, but an advantageous embodiment in practice is to provide the bottom of the blocking cartridge 4 with a hard rubber insert 21, so that the blocking cartridge 4 can still carry out the function of a buffer cartridge to back off and relax the striking spring of the pistol 1.

Also not the subject matter of the invention, but also advantageous in practice is for the closure cone 6 to be in the form of a muzzle protector and the connecting rod 8 to be in the form of a barrel cleaner by virtue of felt 22 attached to its surface or similar.

Figure 7:
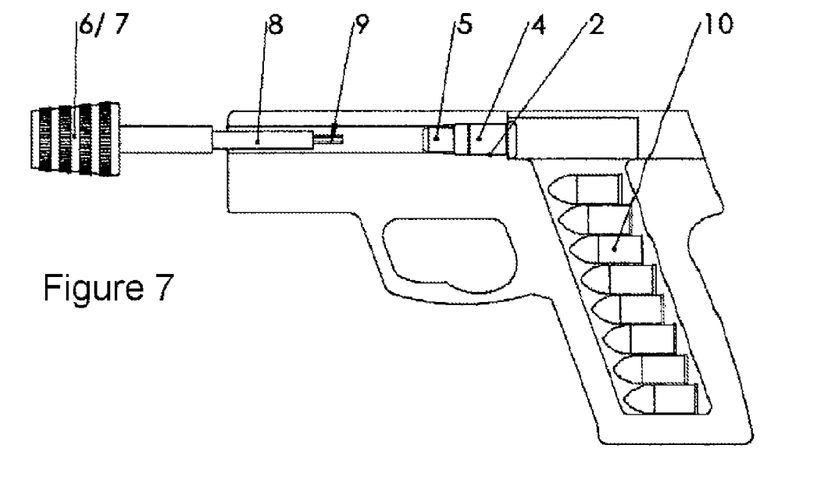
FIG. 7 shows the safety system following manipulation

An attack on the safety system is mainly in the form of forcible withdrawal of the connecting rod 8 with the use of a tool insertion on the closure cone 6 or, after opening the breech of the pistol 1, by forcible ejection of the blocking cartridge 4 by means of the cartridge puller of the pistol 1 itself or likewise with the use of a tool insertion on the bottom of the blocking cartridge 4.

A drawknife arrangement 20 that is connected to the locking system 5 and that engages in the reaction chamber 12 can be moved within the reaction chamber 12 so as to tear open the container 16, being moved by means of the activation arrangement 19, consisting in the exemplary embodiment of a threaded joint 23 between the blocking cartridge 4 and the locking system 5 within the reaction chamber 12, the joint being in the form of a predetermined breaking point. The mixing individual components 17 react with each other, wherein the initially still pasty adhesive system 18 expands and is forced through the outlet openings 14 and via the longitudinal grooves 13 to the wall of the cartridge chamber 2. The adhesive system 18 hardens, whereby the pistol 1 is unusable.

If the attempt at manipulation is made on the blocking cartridge 4 itself, displacement of the drawknife arrangement 20 within the reaction chamber 12 occurs following breakdown of the threaded joint 23 in the event of an attempt at forcible removal of the blocking cartridge 4 from the cartridge chamber 2, with the resulting destruction of the container 16 of the adhesive system 18 containing the individual components 17 and the escape of the adhesive system 18 into the cartridge chamber 2.

As FIG. 6 shows, the activation arrangement 19 can also be designed such that in the event of an axial traction force a pretensioned drawbar arrangement 24 releases an impact tip 25 penetrating into the reaction chamber 12 to destroy the container 16 with the adhesive system 18.

Figure 8:
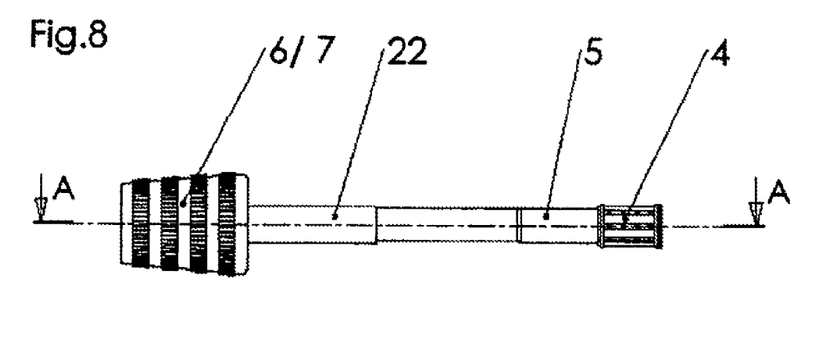
FIG. 8 shows the safety system with percussion cap and impact tip
Figure 9:
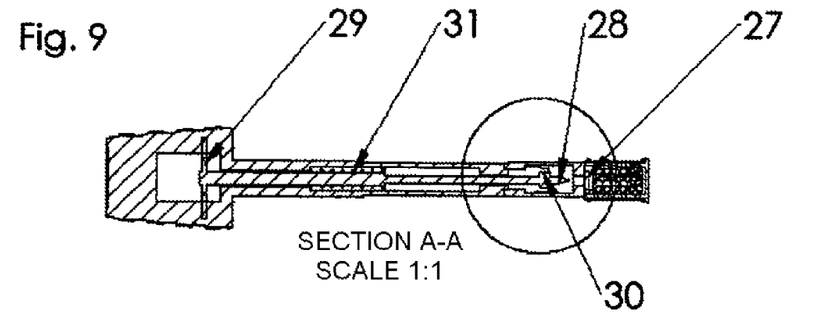
FIG. 9 shows the safety system with percussion cap in a sectional view
Figure 10:
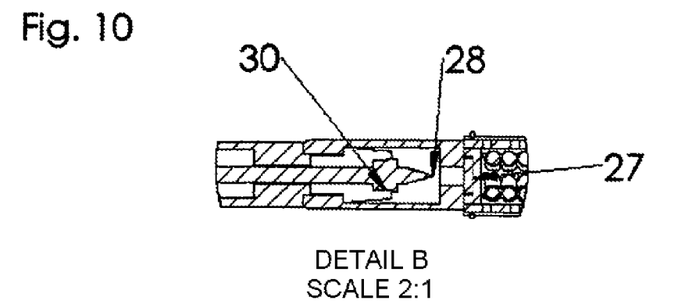
FIG. 10 shows the safety system with percussion cap in detail

A further advantageous embodiment of the invention is shown in FIGS. 8 to 10. In this case an initial explosive, in particular a percussion cap 27, is disposed in front of the reaction chamber 12 of the blocking cartridge 4. In the event of manipulation of the locking means, an expanding cone 30 released by means of a shearing pin 29 and pretensioned by means of a spring 31 strikes against the percussion cap 27 with an impact bolt 28 machined thereon or axially movably guided therein, whereby the detonation pressure occurring in the reaction chamber 12 causes mixing of the individual components 17 of the adhesive system 18 disposed there, which in this case can also advantageously be used in granulate form. The pressure wave occurring during the detonation of the initial explosive further forces the percussion cap 27 out of its mounting in the blocking cartridge 4 and pushes the expanding cone 30 back into its initial position. The safety system is thus additionally locked in fractions of a second.

In order to prevent the extraction of the blocking cartridge 4 from the cartridge chamber 2 by means of the cartridge extractor engaging the collar of the cartridge or in order to prevent the triggering of the activation arrangement 19 when opening the lock of the pistol 1, the collar 26 of the blocking cartridge 4 can be completely or partly of radially shortened and tapered form.

Following triggering of the safety system with the result that the cartridge chamber 2 adheres to the blocking cartridge 4, the functionality of the pistol 1 can be restored without damage by activating a joint-dissolving technology that is matched to the composition of the adhesive system 18 in the adhered region, advantageously using a solvent and not shown in more detail in the exemplary embodiment.

The composition and hence the effectiveness of the solvent can be matched by the manufacturer to the composition of the adhesive system 18 for this, so that optimally only such authorized installations or persons that are responsible for the use of the safety system have the solvent available.

The invention claimed is:

1. A safety system for a hand gun to prevent unauthorized use comprising:
   a container for insertion with positive locking is a provided with an internal supply of individual components of an adhesive system so as to be lockable in a cartridge chamber of the hand gun to be protected; and
   wherein, in the event of an improper opening and manipulation attempt on a locking means, mixing of the individual components of the adhesive system is triggered and the mixed individual components escape through openings in a wall of the container by expansion into the cartridge chamber and adheres the cartridge chamber to the container preventing further use of the hand gun until the activation of a joint-dissolving technology.

2. The safety system as claimed in claim 1, wherein the container is a blocking cartridge modelled on a cartridge that is insertable into the cartridge chamber of the hand gun to be protected, wherein the wall of the blocking cartridge, which is provided with passages, contains a reaction chamber with a supply of individual components of the adhesive system located therein and an activation arrangement for mixing the individual components of the adhesive system in the event of manipulation of the safety system and the blocking cartridge can be locked by means of a locking system connected on the muzzle side,
   said locking system having a connecting rod axially rotatably guided in the barrel of the hand gun with a key bit that can engage within the locking device and a closure cone with a lock essentially externally covering the muzzle of the hand gun.

3. The safety system as claimed in claim 2, wherein the locking system is a rotary lock for accepting and locking a key bit that is disposed on the connecting rod.

4. The safety system as claimed in claim 2, wherein the closure cone itself is a numerical combination lock.

5. The safety system as claimed in claim 2, wherein the activation arrangement for mixing the components of the adhesive system is an axially tearable threaded joint between the locking system and the blocking cartridge and the locking system is provided with a drawknife arrangement protruding into the reaction chamber.

6. The safety system as claimed in claim 2, wherein the activation system for mixing the individual components of the adhesive system is a pretensionable drawbar arrangement with an impact tip for striking in the reaction chamber.

7. The safety system as claimed in claim 2, wherein the activation system for mixing the individual components of the adhesive system is a percussion cap disposed in the blocking cartridge in front of the reaction chamber with an impact bolt that can be triggered by a shearing pin-spring arrangement for striking into the percussion cap.

8. The safety system as claimed in claim 2, wherein the wall of the blocking cartridge is provided with at least one o-ring elastic material.

9. The safety system as claimed in claim 2, wherein a collar of the blocking cartridge modelled on the blocking cartridge of the hand gun is radially shortened and tapered.

10. The safety system as claimed in claim 2, wherein a bottom of the blocking cartridge is provided with a hard rubber pad.

11. The safety system as claimed in claim 2, wherein the connecting rod is provided with a felt pad.

\* \* \* \* \*